Nov. 6, 1951  J. A. VICTOREEN  2,573,999
IONIZATION CHAMBER
Filed Jan. 27, 1947  2 SHEETS—SHEET 1
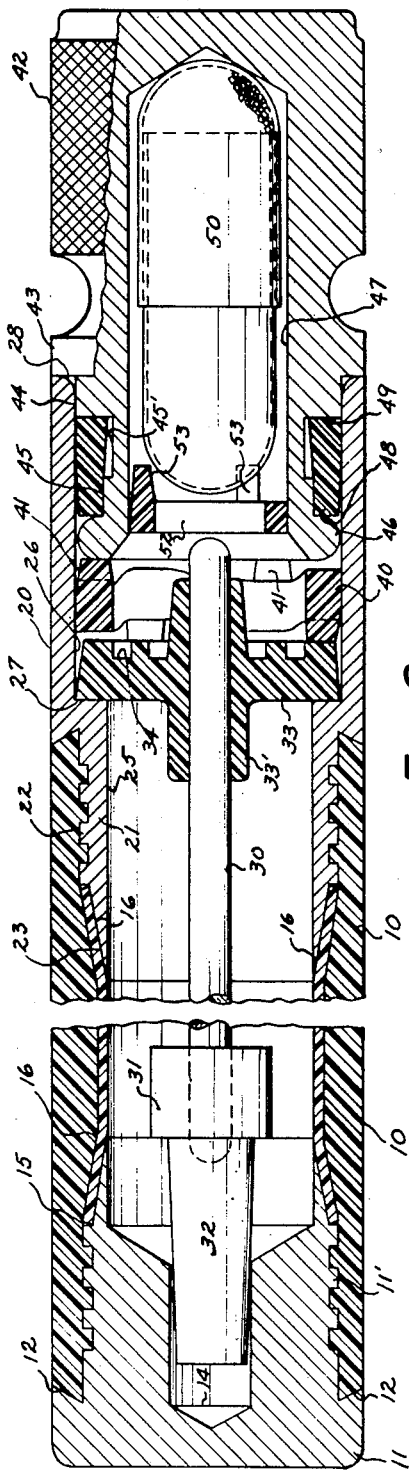
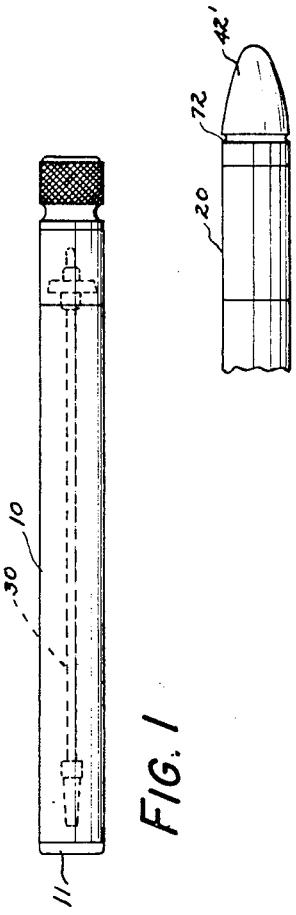
INVENTOR.
JOHN A. VICTOREEN
BY
*J. D. Douglas*
HIS ATTORNEY Nov. 6, 1951  J. A. VICTOREEN  2,573,999
IONIZATION CHAMBER
Filed Jan. 27, 1947  2 SHEETS—SHEET 2
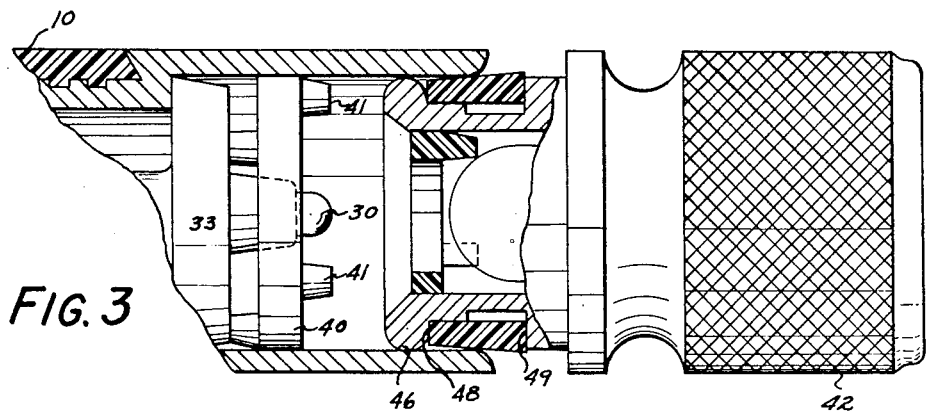
FIG. 3
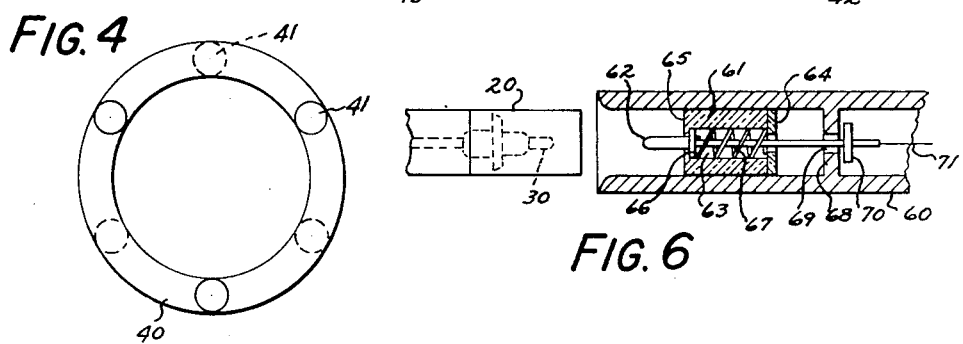
FIG. 4
FIG. 6
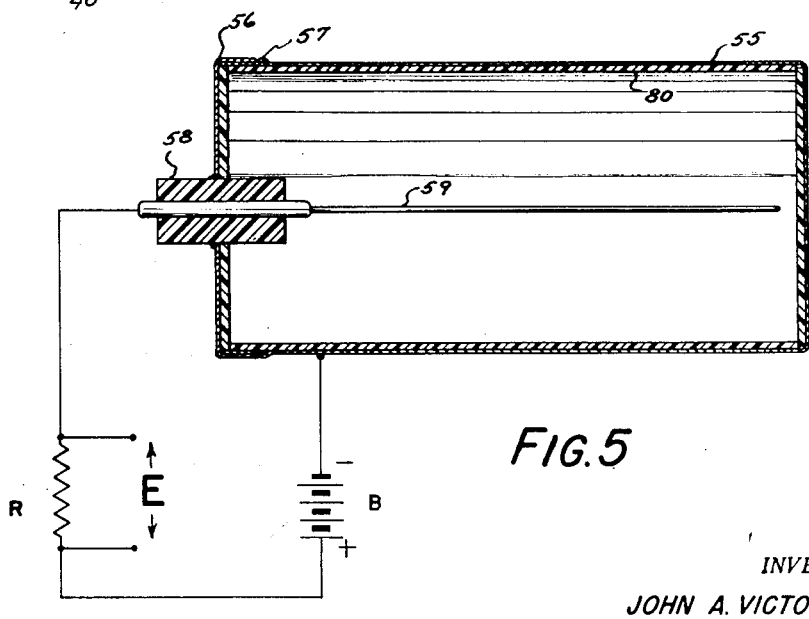
FIG. 5
INVENTOR.
JOHN A. VICTOREEN
BY
*J. D. Douglas*
HIS ATTORNEY Patented Nov. 6, 1951

2,573,999

UNITED STATES PATENT OFFICE 2,573,999

IONIZATION CHAMBER

John A. Victoreen, Cleveland, Ohio, assignor to Victoreen Instrument Company, Cleveland, Ohio Application January 27, 1947, Serial No. 724,601

13 Claims. (Cl. 313—93)

This invention relates to improvements in instruments for the measurement of radiant energy, and more particularly to improvements in ionization chambers.

As is well known to those versed in the art, it has become common practice to measure the amount of radiation from X-ray machines or other sources by providing a chamber having electrodes which act as a condenser capable of holding a charge and which charge is dissipated according to the amount of rays to which the chamber is subjected, the dissipation being due to the ionization of the air or other gas which causes neutralization of the charge.

In practice, this ionization chamber is usually charged by some source of potential and the amount of the charge indicated. The chamber may then be placed in the path of the rays, subjected to the radiation and subsequently the remaining charge indicated and the difference measured. The amount of dissipation of the charge furnishes an indication of the amount of radiation to which the chamber has been subjected. If desired, the measuring instrument may be calibrated in terms of Roentgen units.

The chamber, as stated, is usually a form of condenser, and preferably comprises an outer, usually cylindrical, electrode and an inner rodlike electrode which may be supported in coaxial spaced relation to the outer electrode. The composition of the component parts should be such that rays will penetrate the walls and ionize the air, and if properly designed, the resultant effect will be the same as the ionization of a predetermined quantity of air, because the unit of measurement of the radiation is based on the ionization of air.

Another desiderium is that the material be such that it will allow the passage of the desired rays and also that it be substantially impervious to moisture.

These instruments are useful in other places besides the mere measurement of Roentgen rays. One particularly important use is where the chamber is made in the form of a portable device which may be carried on the person for a day or more by those working in atomic research. In this case, the chambers may be about the size and shape of a pen or pencil which may be carried in a pocket of the user's clothing and are checked frequently to determine the state of charge and, hence, the amount of radiation to which the person has been subjected I have found that a preferred form of chamber comprises an outer supporting casing which is designed for rigidity and as well as being substantially or completely moisture proof. Heretofore, it was the practice to provide this casing with an inner surface of carbon. In some instances, this was satisfactory, particularly where it was not subjected to rough usage, but when the chamber was subjected to rough usage, it was not uncommon for the carbon to flake off and change the characteristics of the chamber, as well as often providing actual short circuits which caused premature dissipation of the charge.

I have discovered that a more highly satisfactory chamber can be constructed having an outer insulating wall of a suitable material in which is inserted an inner conducting non-metallic liner. The liner is chosen to have a characteristic such that it can be coated or impregnated with carbon, which carbon will not shake or flake off even in the presence of most rough treatment. Carbon is selected as the coating, or impregnating element, because it is a proper electrical conductor, has a low atomic number (6), and can be painted on, or the liner easily impregnated therewith. In some cases, boron may be utilized where the purpose is to measure neutrons. A suitable center electrode may comprise an aluminum rod which has an atomic number of 13. The proportions of the outer carbon electrode and the aluminum rod are so designed that they provide a balance affording an over-all equivalent to the atomic number of approximately 7.69 which is that of air. This may vary between 7.50 and 7.80.

Therefore, such a chamber may be charged to a predetermined potential, then this chamber is subjected to radiation, which causes the gas therein to ionize, resulting in a dissipation of the charge. The remaining charge can then be determined. The charge indicating instrumentality may be calibrated, if desired, to determine the exact amount of radiation to which the chamber (and the person carrying it) has been subjected. The liner may be paper impregnated with carbon or molded plastic having carbon therein.

The use of the carbon impregnated liner provides a simple and expedient means of forming a chamber, and assures that the chamber constants will remain fixed over long periods of time.

As I previously stated, these chambers are particularly useful when the subject matter of the invention is incorporated in a small chamber adapted to be carried on the person. Such a chamber, hereinafter called a pocket chamber, is illustrated in the accompanying drawings, wherein—

Fig. 1 is an exterior view of a pocket chamber embodying my invention;

Fig. 2 is an enlarged fragmentary vertical medial section thereof;

Fig. 3 is an enlarged sectional view showing details of construction of the removable cap and the retaining ring for holding the center electrode in place with the cap partially removed;

Fig. 4 is an enlarged end view of the electrode clamping ring;

Fig. 5 is a sectional view of a chamber embodying the principles of my invention and showing diagrammatically the manner in which it may be used as a rate per minute meter.

Fig. 6 is a fragmentary view of a coupling device for maintaining a fixed capacity between the chamber and the indicating instrumentality; and Fig. 7 is a modified form of the chamber cap.

Referring to the drawings, throughout which like parts have been designated by like reference characters, and more particularly to Figs. 1 to 4 inclusive, the pocket chamber includes an outer cylindrical body 10 which may be made of a plastic synthetic resin, such as cellulose acetobutyrate. Preferably, the chamber is formed in a suitable press, the plastic being molded under heat and pressure.

Secured in one end of the body in an aluminum bottom or base member 11 which is provided with a portion of reduced diameter 11', the junction of the two portions providing an undercut shoulder 12 against which the plastic extends, the reduced portion being grooved on its periphery. The center of the base is provided with a centrally disposed recess, or pocket 14, which is adapted to receive the electrode support as will later be more fully described. The end of the portion 11' is tapered from the shoulder 15, which shoulder provides an abutment for the liner 16 that carries the carbon and which rests on the tapered portion.

When the linear 16 is made of carbon impregnated paper, it may be inserted in the chamber after formation thereof and be removable when desired. I have found, however, that a very desirable way to manufacture the same is to mold the plastic onto the end 11 and the top end coupling 20, hereafter described together with the conducting liner. The liner may be impregnated with the carbon before or after molding.

The other end of the chamber is provided with an open ended coupling 20, also formed of aluminum, which comprises a cylindrical body 20, the end of which is of reduced diameter at 21, and is provided with circumferential ribs 22 adapted to provide a secure grip with the plastic. The extremity is tapered at 23 adapted to extend into and afford contact with the carbon of the liner 16 and make a good electrical contact therewith. The base end also has the conducting liner in contact with the metal.

The inner surface of the coupling 20 is cylindrical at 25, preferably of a diameter the same as the inside of the liner. The coupling is counterbored at 26 to provide a shoulder 27 against which the center electrode support may rest. The open end is provided with a curved extremity 28 which is a formation that permits easy insertion of the cap.

The inner electrode is removably supported in the chamber in coaxial relation thereto and includes an aluminum rod or wire 30 which, in practice, may also be coated with carbon, a suitable binder being used to cause a firm adherence. The one end of the electrode is embedded in a support plug of polystyrene that may include a cylindrical body 31 having a slightly conical extension or projection 32 adapted to extend into and seat in the pocket 14. The other support for the electrode 30 comprises a disc 33 of polystyrene having an axial body 33' which engages the rod. The exterior surface of the disc is grooved, as indicated at 34 to provide an enlarged surface resistance path. The end of the electrode extends beyond the disc 33, and the disc 33 is adapted to be seated on the shoulder 27 and held in place by a ring 40.

The ring 40 is preferably formed of polyethylene and comprises a body in the form of a ring from the opposite faces of which extend projections 41. It will be noted that the projections are disposed in alternately spaced relation to each other on the opposite sides; hence, when pressure is exerted against the projections, the ring is deformed from the shape shown in Fig. 3 to the shape shown in Fig. 2. The ring, therefore, provides a springlike member which, when the cap 20 is in place, holds the center electrode spring pressed securely in position. Since the pressure is against the polystyrene member 33, which is brittle, and the ring is resilient, and because of the manner in which it is deformed, the disc 33 is held securely against the shoulder 27 without danger of fracture.

The chamber is adapted to be closed by a cap. It is desirable that the cap seal the chamber electrically as well as be air tight. It is also desirable that it be readily removable and that it be impossible for it to short circuit the center electrode during capping or removal of the cap. To this end the cap is provided with a knurled head 42, having a flange 43 adapted to abut the end 28 of the coupling 20 when in place. Adjacent the flange 43, the barrel of the cap is of reduced diameter at 44 permitting it to readily slide inside the bore 26. The intermediate portion of the barrel adjacent the part 44 is provided with a circumferential channel 45. The end of the barrel terminates in an annular flange 46, the periphery being of a diameter substantially equal to that of the barrel at 44 and of curved or circular cross section. Adjacent the flange 44 the channel 45 is provided with a deeper channel 45'. Normally, the barrel portion of the cap slides relatively easily into the bore 26 of the coupling 20. The rounded flange 46 of the cap and the rounded end 28 of the coupling cooperate during insertion of the cap to provide for easy insertion thereof. Normally, when the cap is in position, the flange 46 on the end of the barrel engages the projections 41 on the face of the ring 40 forcing them backward toward the disc 33 of the center electrode, thus causing deformation of the ring as can best be seen in Fig. 2.

Means are provided to form a seal for the cap with the coupling 20 which is air tight and moisture proof. This is provided by forming a tapered ring of polyethylene. One end 48 of the ring is seated on the body 45 and in engagement with the flange 46. The other end 49, as best illustrated in Fig. 4, extends over in spaced relation to the channel 45' and in sliding engagement with the shoulder on the barrel 44.

It will be noticed that the inner end, which rests on the body 45, is of a diameter less than the inside diameter 26 of the coupling 20, while the other end 49 is of larger diameter. Thus when the cap is shoved into the coupling, the small end permits easy entrance but, as it is inserted farther, the periphery of the ring hits the surface 28, which shoves the ring down into the channel 45'. The polyethylene deforms under this pressure and forms an air tight and moisture proof seal with the portion 45 of the cap, and the end 49 seals against the inner surface of the bore 26 of the coupling 20. The resiliency of the ring maintains the seal and readily springs back to its normal position when the cap is removed. Thus, the cap although readily inserted and removed is securely held in place.

Means is also provided to assure that the interior of the instrument remains free from moisture, for although the device is moisture proof, it will be appreciated that the cap is removed frequently to measure the remaining charge and to permit recharging of the same. To this end a moisture transmitting capsule 50 is provided which may be made of gelatin, cellulose, or the like, and is filled with silica-gel, or other desiccant, combined with a suitable indicator such as cobalt. The capsule is disposed in an axial bore 47 in the cap and held in place by a polyethylene ring 52 which engages the wall of the bore 47 and has points 53 which engage the capsule. The ring may be readily removed for renewal of the capsule when the color of the material within the capsule changes from blue to pink, thus indicating the state of humidity within the chamber.

Fig. 5 shows my invention as embodied in a larger ionization chamber, particularly adaptable as a Roentgen per minute meter.

It comprises a can or shell 55, one end of which is closed by a cap 56 that is slipped over the open end of the cap and the edge of which engages a bead 57 on the can adjacent the edge. The cap is provided with an insulating plug 58 which is secured to and extends through the center of the cap. The plug supports an electrode which comprises a rod 59 that extends through the plug into the interior of the can in spaced relation to the walls.

The can is provided with a liner 80 which may be similar to that previously described. It may be of a synthetic resin having a dispersion of carbon therein or paper impregnated with carbon. In either event, it should be electrically connected to the walls of the can but does not necessarily have to fit tight.

I have also shown a circuit wherein a battery B is connected to the can and through a resistor R to the center electrode. A meter, not shown, may be connected at opposite ends of the resistor to measure the voltage drop across the resistor. The meter reading will vary with the degree of ionization occurring within the chamber and, therefore, is capable of being calibrated in roentgens per minute.

As I previously stated, the pocket chamber is adapted to be charged and/or the charge measured by a separate instrumentality. This entails certain difficulties, such as making a proper connection to the center electrode and, at the same time, eliminating the effect of the change in capacity in the system when the chamber is brought into conjunction therewith. An apparatus for effecting this is illustrated in Fig. 6. In this figure, the end of the chamber is shown about to be brought into connection with a connector 60 which is a part of the measuring and charging means, not shown. The end of the chamber 20 is slidable in the coupling 60, and the electrode 30 engages the contact pin 62, which is slidably in the connector 60. The connector 60 supports an insulating block 61 of polystyrene which has a bore 63, the ends being provided with walls 64—65 having central openings. The pin 62 is provided with a flange 66 and a spring 67 disposed around the pins engages the flange with one end and the wall 64 with the other end holding the pin spring-pressed to the left as viewed in the figure. The interior wall of the connector 60 is provided with an inwardly extending flange 68 having a clearance hole 69 for the pin.

The pin is provided with a flange 70, and the end is connected by a flexible lead 71 to the instrument. Normally, the flange 70 which is of conducting material is disposed in closely spaced relation to the wall 68. This particular system enables the chamber to mechanically change the capacity in the system to either increase or decrease the capacity as desired to maintain the desired balance in the system. When the connector pin 62 is engaged by the electrode 30, it is forced backward against the pressure of the spring 67 allowing the flange 70 to move away from the wall 68. Obviously, if it was desired to increase the capacity, the flange 70 would merely be placed on the other side of the wall, and when the chamber was attached, it would move closer to the partition.

As I previously stated, the cap must be removed to facilitate charging and the determination of the remaining charge. It is also desirable to so construct the tube as to eliminate accidental or purposeful tampering with the cap by curious persons. To this end, I also provide a modified form of cap as illustrated in Fig. 7.

In this case, the exterior shape of the cap is changed, it being provided with a smooth rounded surface 42' which is difficult to engage with the fingers. In order to facilitate removal, a narrow circular channel 72 is provided which may be engaged by a suitable instrument when it is desired to remove the cap.

It will thus be seen that I have provided an improved ionization chamber where the inner surface and the one that emits photoelectrons, upon being subjected to radiation, can be coated or impregnated with a material of the desired atomic number to provide the desired emission and that the design is such that the characteristics thereof remain the same over long periods of time.

The photo-electron balance within the chamber is dependent upon the photoelectric emission properties of the surfaces which combine the area of the center electrode and the wall. This combination releases the desired number of electrons, upon exposure to radiation, to provide the desired wave length response. Both the aluminum rod and the carbon coating provide photo-electron emitting material which, in the presence of radiation, release the desired number of photo-electrons.

Furthermore, it has been shown how the center electrode may be supported by a desirable insulating material which is subject to fracture but is prevented therefrom by its manner of support.

It has also been shown how a desirable means for securing a cap onto the end of the chamber is provided, which eliminates screw threads, simplifies the manner of removal and replacing thereof and yet furnishes a tight joint which is substantially impervious to moisture. Furthermore, it is shown how the interior of the device may be kept substantially moisture-free in spite of the frequent removal of the cap and how this condition can be determined at a glance.

Having thus described my invention, I am aware that numerous and extensive departures may be made therefrom without departing from the spirit or scope of the invention.

I claim:

1. A pocket chamber comprising a barrel having a carbon impregnated liner therein, a bottom closure and an open top, an electrode supported in said barrel and insulated therefrom, a removable cap slidable into the open top and means to seal the cap to the top.

2. A pocket chamber including a composite barrel closed at one end and open at the other end having an electrically conducting liner surface, a metal coupling for the open end of the barrel, an electrode insulated from the barrel and supported coaxially therein, a cap for closing the open end of the barrel and including a portion for slidable engagement with the barrel, means to seal the cap to the coupling against air and moisture, and resilient means to hold said center electrode securely in place.

3. A pocket chamber including an outer electrode, a center electrode having supporting means for supporting it in spaced insulated condition from the outer electrode, a removable cap for sealing said chamber, deformable ring means for holding the center electrode in said chamber and means on said cap for engaging with said ring means to deform the same when the cap is in place and exert pressure on the support for the center electrode.

4. A pocket ionization chamber including a cylindrical outer electrode having a closed end and an open end, an inner electrode disposed inside of and in spaced relation to the cylindrical electrode and insulated support means therefor, a closure for the open end of the chamber comprising a cap having a portion adapted to extend into the chamber and resilient ring means interposed between the end of the cap and the inner electrode support for engagement with the end of the cap and the electrode support for exerting resilient pressure on the inner electrode support when the cap is in position closing the container.

5. A pocket ionization chamber including a cylindrical outer electrode having a closed end and an open end, a center electrode disposed in coaxial relation to the cylindrical electrode and insulated support means therefor, a closure for the open end of the chamber comprising a cap having a portion adapted to extend into the chamber and means interposed between the end of the cap and the center electrode support for engagement with the end of the cap and the electrode support for exerting spring pressure on the center electrode support when the cap is in position closing the container comprising a deformable member of polyethylene.

6. A pocket ionization chamber including a cylindrical outer electrode having a closed end and an open end, an electrode disposed in spaced relation to the cylindrical electrode and insulated support means therefor, a closure for the open end of the chamber comprising a cap having a portion adapted to extend into the chamber and means interposed between the end of the cap and the inner electrode support for engagement with the end of the cap and the electrode support adapted to exert spring pressure on the center electrode support when the cap is in position closing the container, comprising a ring of polyethylene formed with projections on the opposite sides disposed in alternate spaced relation to each other.

7. A pocket ionization chamber including a cylindrical outer electrode having a closed end and an open end, a center electrode disposed in coaxial relation to the cylindrical electrode and insulated support means therefor, a closure for the open end of the chamber comprising a cap having a portion adapted to extend into the chamber and means interposed between the end of the cap and the center electrode support for engagement with the end of the cap and the electrode support for exerting spring pressure on the center electrode support when the cap is in position closing the container, said cap being formed with a chamber in communication with the ionization chamber a renewable desiccating agent carried by said cap in said chamber.

8. A pocket ionization chamber including a cylindrical outer electrode having a closed end and an open end, an inner electrode disposed in spaced relation to the outer electrode and insulating support means therefor, a closure for the open end of the chamber including a cap having a portion adapted to extend into the chamber and means interposed between the end of the cap and the inner electrode support for engagement with the end of the cap and the electrode support adapted to exert spring pressure on the center electrode support when the cap is in position closing the container, said cap being formed with a chamber in communication with the ionization chamber a renewable desiccating agent carried by said cap and indicator means for indicating the condition thereof in said chamber.

9. A pocket ionization chamber comprising a hollow cylindrical body having a conducting and photo electron emitting inner surface, a center electrode supported in coaxial insulated spaced relation from said cylindrical body said cylindrical body being closed at one end and open at the other end, closure means for closing the open end of the body comprising a cap having a portion for seating engagement with the body and formed with a curved outer surface exterior of the body and with a recess for engagement by a tool to effect removal thereof.

10. In combination with an ionization chamber adapted to be charged to a predetermined potential and means for measuring or indicating the state of charge of the ionization chamber, said ionization chamber being removable from said indicating means and to be discharged in accordance with its exposure to radiation, means for eliminating the change in capacity when the chamber is connected to said indicating means comprising a variable capacity which is operated by attachment of the chamber to change the capacity.

11. In combination with an ionization chamber adapted to be charged to a predetermined potential and means for measuring or indicating the state of charge of ionization chamber, said ionization chamber being removable from said indicating means and to be discharged in accordance with its exposure to radiation, means for eliminating the change in capacity when the chamber is connected to said indicating means comprising a variable capacity which is varied to increase or decrease the capacity, including means engageable with said ionization chamber and movable thereby.

12. A pocket ionization chamber comprising a hollow cylindrical body, a liner for said body formed of paper and impregnated with conductive photo electron emitting material, a metallic end wall closing one end of said body and formed with a socket therein, a metallic sleeve forming the open end of said body and formed with an internal shoulder, a center electrode for said chamber including a metallic rod, an insulating support member for one end of the rod holding the rod and removably engaged in said socket, intermediate insulating support means for said rod comprising a member surrounding the rod and seated on said shoulder, a ring, for engagement with said last mentioned support, formed of resilient material, a metallic cap for said chamber having a portion for sliding engagement in said sleeve and engageable with said resilient member to deform the same and hold said electrode support securely on said shoulder.

13. In a pocket ionization chamber comprising a hollow cylindrical body having a conducting and photo electron emitting inner surface, a center electrode supported in a coaxial insulated spaced relation from said cylindrical body, said cylindrical body being closed at one end and open at the other end, closure means for closing the open end of the body comprising a cap having a portion for seating engagement with the body and formed with a curved outer surface exterior of the body and formed with a circumferentially extending channel for pulling engagement by a tool to effect removal thereof.

JOHN A. VICTOREEN.

REFERENCES CITED

The following references are of record in the file of this patent:

UNITED STATES PATENTS

| Number | Name | Date |
| --- | --- | --- |
| 307,428 | Borden | Nov. 4, 1884 |
| 703,524 | Brewington | July 1, 1902 |
| 723,645 | Brown | Mar. 24, 1903 |
| 1,855,669 | Glasser et al. | Apr. 26, 1932 |
| 2,273,869 | Julien | Feb. 24, 1942 |
| 2,362,796 | Boesel | Nov. 14, 1944 |
| 2,376,196 | Scherbatskoy | May 15, 1945 |

FOREIGN PATENTS

| Number | Country | Date |
| --- | --- | --- |
| 10,762 | Great Britain | 1889 |
| 296,769 | Great Britain | Apr. 25, 1929 |
| 472,110 | Germany | Feb. 22, 1929 |
| 615,966 | Germany | July 17, 1925 |
| 740,500 | France | Nov. 14, 1942 |

OTHER REFERENCES

Atomic Energy Commission Publication AECD.-1972—8 pgs., Sept. 13, 1945.

Atomic Energy Commission Publication MDDC-886—4 pgs., Jan. 17, 1947.

Atomic Energy Commission Publication MDDC-395—8 pgs., Dec. 13, 1945.